United States Patent
Wang et al.

(10) Patent No.: US 9,128,749 B1
(45) Date of Patent: Sep. 8, 2015

(54) METHOD AND SYSTEM FOR LOCK FREE STATISTICS COLLECTION

(71) Applicant: EMC Corporation, Hopkinton, MA (US)

(72) Inventors: Rock L. Wang, Danville, CA (US); Shu-Shang Sam Wei, Danville, CA (US)

(73) Assignee: EMC CORPORATION, Hopkinton, MA (US)

( * ) Notice: Subject to any disclaimer, the term of this patent is extended or adjusted under 35 U.S.C. 154(b) by 278 days.

(21) Appl. No.: 13/928,576

(22) Filed: Jun. 27, 2013

(51) Int. Cl.
G06F 9/455 (2006.01)
G06F 9/46 (2006.01)
G06F 9/54 (2006.01)

(52) U.S. Cl.
CPC ........... *G06F 9/46* (2013.01); *G06F 9/541* (2013.01); *G06F 9/546* (2013.01)

(58) Field of Classification Search
None
See application file for complete search history.

(56) References Cited

U.S. PATENT DOCUMENTS

| 7,017,160 | B2* | 3/2006 | Martin et al. ............ 719/315 |
| 7,373,514 | B2* | 5/2008 | Krueger et al. .......... 713/181 |
| 7,702,628 | B1* | 4/2010 | Luchangco et al. ... 707/999.006 |
| 2010/0192161 | A1* | 7/2010 | Eilebrecht ............ 719/314 |
| 2012/0304159 | A1* | 11/2012 | Ceze et al. ............ 717/140 |

* cited by examiner

*Primary Examiner* — Lewis A Bullock, Jr.
*Assistant Examiner* — Wynuel Aquino
(74) *Attorney, Agent, or Firm* — Dergosits & Noah LLP; Todd A. Noah

(57) ABSTRACT

Lock free collection of performance data from an application program executing in a computer system having a multi-core central processing unit is described. A data collection mechanism creates a water mark queue that includes a data structure to store an array and plurality of pointers, including head, tail, high water mark and low water mark pointers. A plurality of worker threads is spawned, each configured to collect and store data from the application program. The data collection includes incrementing the head pointer, reading an index from a head element of the array and incrementing the high water mark pointer in a single transaction. A context is retrieved corresponding to the retrieved index. An operation is performed based on information contained in the retrieved context. Subsequently, the tail pointer is incremented, the index is written to a tail element of the array and the low water mark pointer is incremented.

20 Claims, 3 Drawing Sheets

METHOD AND SYSTEM FOR LOCK FREE STATISTICS COLLECTION

BACKGROUND

System monitoring is important to ensure a healthy computing environment. Even more important is the application level monitoring to ensure easy and early identification of potential issues so that that application uptime is maintained at a high number. One way to monitor a running application is to collection performance data statistics from programming modules.

Information extracted out of collected monitoring data is used in a wide variety of ways over the lifetime of any application deployment, such as identifying connectivity issues, module failures, troubleshooting a product issue, analyzing application performance, extracting performance metrics such as response times and run time memory usage, building a knowledge base related to usage patterns and/or trends, and analyzing large amounts of data, such as recommendation engines. Often the information that is captured in application monitoring is turned into knowledge which can be used to improve the predictability and/or usability of an application program.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
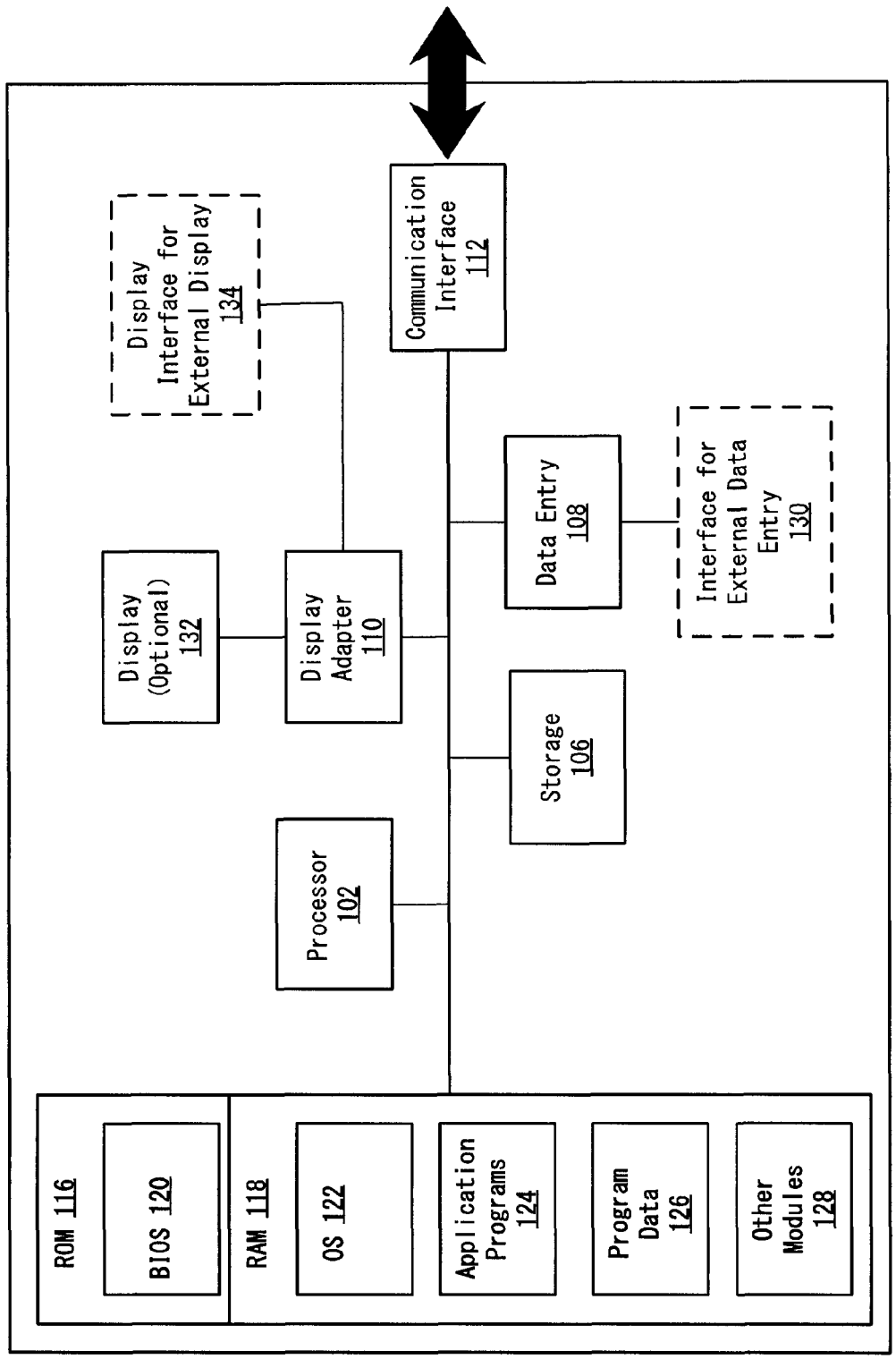
FIG. 1 is a block diagram illustrating an example hardware device in which the subject matter may be implemented.

Runtime performance data may provide a great deal of insight into potential performance issues with a running application. For example, a statistics of execution time of each method (or at least critical methods) in an application program may be used to identify critical performance bottlenecks and can help system administrators and application architects to take remedial measure to enhance overall system performance. For example, if the collected performance data statistics shows that the execution time of a particular method in a monitored application program is gradually increasing, the system engineers can analyze the method implementation for possible memory leaks, programming or connectivity issues. Such function call level performance data statistics collection provides details about application program running state with real time traffic in production environment.

Solutions are available to instrument application programming code that involves including statistics collection instructions in object code. However, these solutions are only useful in non-production environments (e.g., test environments) because code instrumentation causes substantial performance degradation, making such solutions unsuitable for production environments. This performance degradation may even be more profound in multi-core central processing unit (CPU) environment due to a need for cache synchronization among multiple cores to maintain data integrity in a multi-threaded application execution. In traditional solutions, the overhead of probing is so substantial that some commercial profilers even provide methods such as "Time Exclusive Probe Overhead" to obtain real elapsed time without overhead of probing. Needless to say that due to high overheads of probing, these solutions are not suitable for production environments.

Most modern CPUs include memory cache that typically offers substantially faster data read/write characteristics compared to CPU main memory. A CPU cache is a cache used by the central processing unit of a computer to reduce the average time to access memory. The cache is a smaller, faster memory which stores copies of the data from the most frequently used main memory locations. As long as most memory accesses are cached memory locations, the average latency of memory accesses will be closer to the cache latency than to the latency of main memory.

In a multi-core CPU execution environment, different application threads may be executed by different CPU cores. The following example illustrates cache synchronization and data locking issues in multi-core CPU environments.

Suppose an application program has two running threads and the application program includes the following instruction:

while (1) x++;

Since a normal instruction like this is allowed to run on cached data, if both threads attempt to execute this instruction at a same time, the results of data increment will be undefined. To ensure well defined behavior, when this instruction is executed by the first thread, the other thread must be locked from entering this instruction and caches be synchronized among different CPU-cores. This extra locking and synchronizing overhead can be quite expensive and can substantially slow down the overall execution of the application program.

If the execution of the application program encounters thread synchronization primitive such as critical section, it forces CPU to synchronize its local cache with the main memory as well as synchronization of caches among different CPU cores. This synchronization is an expensive event. In such events the processor cores are forced to discard their own cached copies of the lock, so every running thread encounters a cache miss almost every time, and must use the bus to fetch the new, but unchanged value.

A need for cache synchronization and data locking in some instruction execution scenarios can be avoided by ensuring that only one thread operates on a selected set of data at any given time without using critical sections or other thread synchronization primitives. One or more aspects of the present disclosure addresses providing a lock free collection of application performance statistics in multi core CPU environment using CPU copy and swap (CAS) instruction.

Compare and Swap is an atomic instruction used in multithreading to achieve synchronization. It compares the contents of a memory location to a given value and, only if they are the same, modifies the contents of that memory location to a given new value. This is done as a single atomic operation. In one embodiment, an atomic operation means that all sub-operations or operation steps are performed in a thread without interferences from any other threads until the atomic transaction completes. When one thread starts performing operation steps within an atomic transaction, a second thread competing to perform the same operation is either made to wait or an error is returned when the other thread attempt to perform the operation. The atomicity guarantees that the new value is calculated based on up-to-date information; if the value had been updated by another thread in the meantime, the write would fail. The result of the operation must indicate whether it performed the substitution; this can be done either with a simple Boolean response (this variant is often called compare-and-set), or by returning the value read from the memory location (not the value written to it).

Unlike single processor systems, in multiprocessor or multi-core systems, it is usually impossible to disable interrupts on all processors at the same time to achieve atomicity. Even if it were possible, two or more processors could be attempting to access the same semaphore's memory at the same time, and thus atomicity would not be achieved. The CAS instruction allows any processor to atomically test and modify a memory location, preventing such multiple-processor collisions.

The subject matter presented herein provides a lock free collection of application runtime statistics including function elapsed times in a multi-core CPU execution environment. The lock free collection of such stats introduce substantially reduced overhead compared to traditional solutions thus making the presented methods and systems suitable for incorporation in production execution environments. The subject matter presented herein further provides aggregation of collected stats for a high level monitoring of an application, a group of application or an enterprise as a whole.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) may be connected to the hardware device 100 via optional external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

Optionally, a display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via optional external display interface 134. Other peripheral output devices, not shown, such as speakers and printers, may be connected to the hardware device 100. It should be noted that if the hardware device 100 is incorporated in a server farm environment, the display 132 may be coupled to the hardware device 100 remotely.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for lock free collection of system performance data.

Even though the present disclosure is described for collecting function call elapsed times, the collection of elapsed times and performance statistics as described herein is exemplary. It should be noted that some aspects of the present disclosures may be employed for gathering other types of data statistics such as system logs, system variables, snapshots of data collected from users or other systems, frequently changing data such as stock quotes, to name a few, without diverting from the core concepts described herein. While the kind of the data that is captured to build a performance statistics dataset is predefined, the data that needs to be captured may vary based on the use case that needs to be troubleshot and the context in which the data is evaluated. The kind of the data that is required to troubleshoot any memory bottleneck may not be same as the kind of data that is required for troubleshooting a malfunctioning issue.

Figure 2:
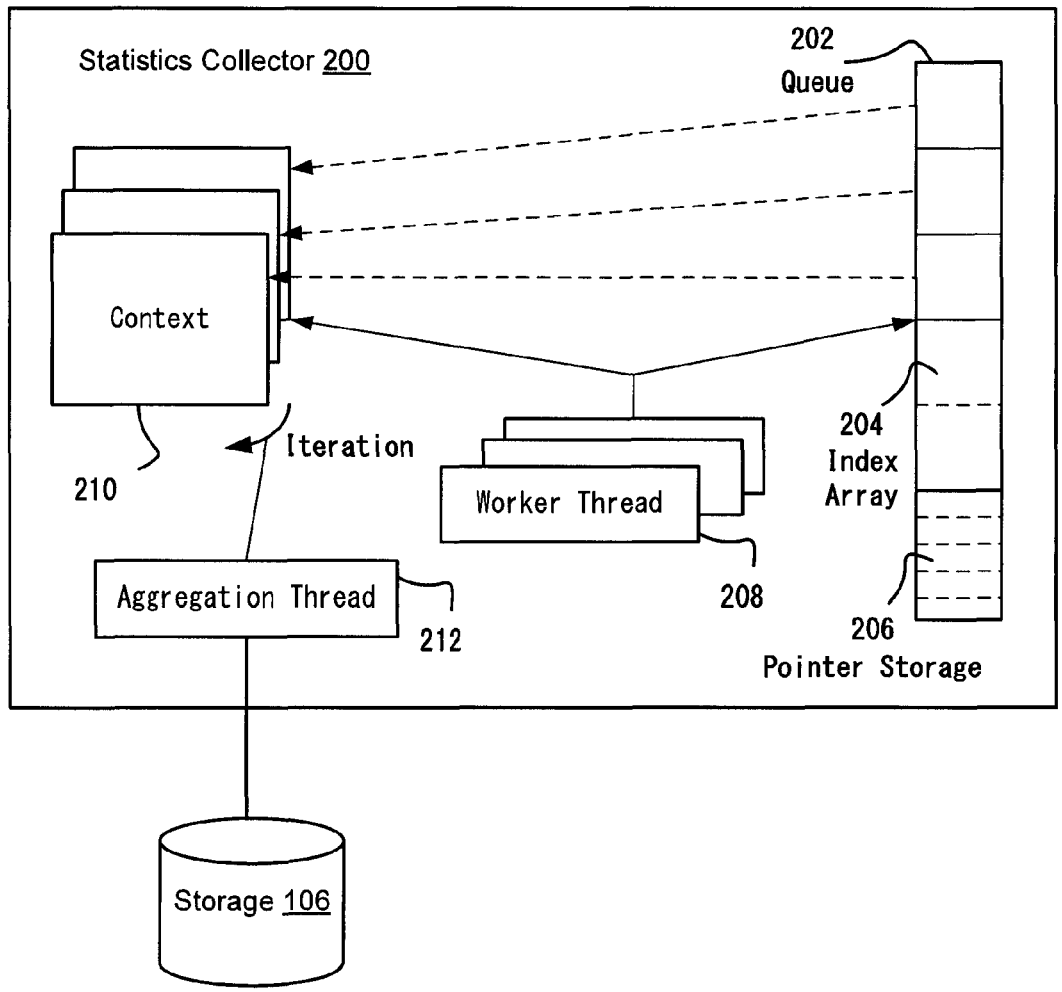
FIG. 2 illustrates a block diagram of an example system for lock free collection of runtime statistics, under an embodiment.

FIG. 2 illustrates an exemplary architecture of a lock free statistics collector 200. In one example, the lock free statistics collector 200 may be implemented in form of an application programming interface (API), thus can be used by application programmers to incorporate the API in their own application programs. Therefore, at runtime, the mechanism lock free statistics collector 200 may be a part of the application program 124 as illustrated in FIG. 1.

In one example, the lock free statistics collector 200 is designed to collect elapsed times of function calls (that is, time taken to execute a function call) and aggregate results. Typically, one way to collect a function call elapsed time is to call a start instruction and an end instruction provided by the lock free statistics collector 200 at the beginning and at the end, respectively, of the function call. In other examples, abstract methods that includes code to mark start and end of the execution of a function call may be provided for implementation of application program classes or function calls.

The function call elapsed time may be determines by starting a timer at or near the entry point of the function call and stopping the timer at or near the exit point of the function and calculating the difference. The elapsed time may also be calculated by saving the current time (e.g., milliseconds elapsed since a pre-configured date/time) at the entry and the exit of the function. The elapsed time may also be calculated in terms of number of cycles the CPU has performed between the entry and the exit of the function call and calculating time elapsed using the CPU frequency. In one embodiment, Timestamp counter register of the CPU may also be used for determining elapsed time in that, to count CPU cycles efficiently, Timestamp counter is incremented on each CPU cycle. In another embodiment, programming language default timer function (e.g., System.currentTimeMills in Java™) may be used to measure elapsed clock time.

The lock free statistics collector 200 maintains a thread local variable to collect data from function calls. As thread is spawned, the thread puts the collector variable in a map object (e.g, HashMap in Java programming language) using thread id as a key. A plurality of other threads may be spawned similarly. It should be noted that even though Java is mentioned herein several times, the lock free statistics collector 200 may be implemented in other programming languages such as C, C++, etc. At runtime, the lock free statistics collector 200 adds elapsed time (and/or other performance variable, if the lock free statistics collector 200 is so configured) of function call in thread's local collector variable. An aggregation thread may also be spawned and configured to iterate through the map at predefined intervals to collect and persist aggregated data.

The lock free statistics collector 200 includes a water mark memory queue 202. The water mark memory queue 202 is a special type of memory queue that includes storage for an integer array 204 and a storage 206 for storing a number of memory pointers. The memory pointers includes a head pointer, a tail pointer, a lower water mark and a high water mark. Memory queues (e.g., first In First Out (FIFO) memory queues) using only head and tail pointers are well known in the art, therefore a detailed described is being omitted herein.

The water mark memory queue 202 includes two additional pointers, low water mark and high water mark pointers. These pointers are used to ensure atomicity of write to or fetch from the water mark queue 202 so that while one thread is either fetching or writing to the water mark queue 202, no other thread can engage the water mark queue 202.

The index integer array 204 is initialized to a preselected size that is equal to the number of contexts in a collection of context 210. The collection of context 210 include contexts that includes data structures to maintain connection info and statistics collection variable (or pointers thereto). Head and high water mark pointers is initiated to 0 (zero) and tail and lower water mark pointers are initialized to size of the index array minus one ($N_{ind}-1$). In one embodiment, the preselected size may be derived from hardware configuration. In another embodiment, the preselected size may depends on a software licensing contract. In yet another embodiment, the preselected size may be derived from past performance testing data.

A plurality of worker threads 208 are spawned, each collecting elapsed time and/or other configured variables and performance data from function calls of the application program 124. Each of the worker threads 208 uses different context from the collection of contexts 210 and a thread in the worker threads 208 fetches a context from the collection of contexts 210 based on an integer fetched from the water mark queue 202. When the thread completes an operation (e.g., updating stats), the thread returns the integer that identifies a context in the collection of contexts 210 back into the water mark queue 202.

In one example, the aggregation thread 212 may be included in the lock free statistics collector 200 and may be configured to run at preselected intervals to collect aggregated data from the data collected by the worker threads 208. The aggregation thread 212 does so by iterating through the collection of contexts 210 and read the collected data therefrom. In some aspects, further aggregation calculations may be performed on the aggregation performed by the aggregation thread 212 to increase or decrease granularity based on configurable environment settings. In one embodiment, the aggregation thread 212 stores the aggregated data in the storage 106. Alternatively, the aggregated data may be uploaded to an external system via a Web API or FTP protocol. The aggregated data may also be kept in volatile memory accessible to the aggregation thread 212.

Figure 3:
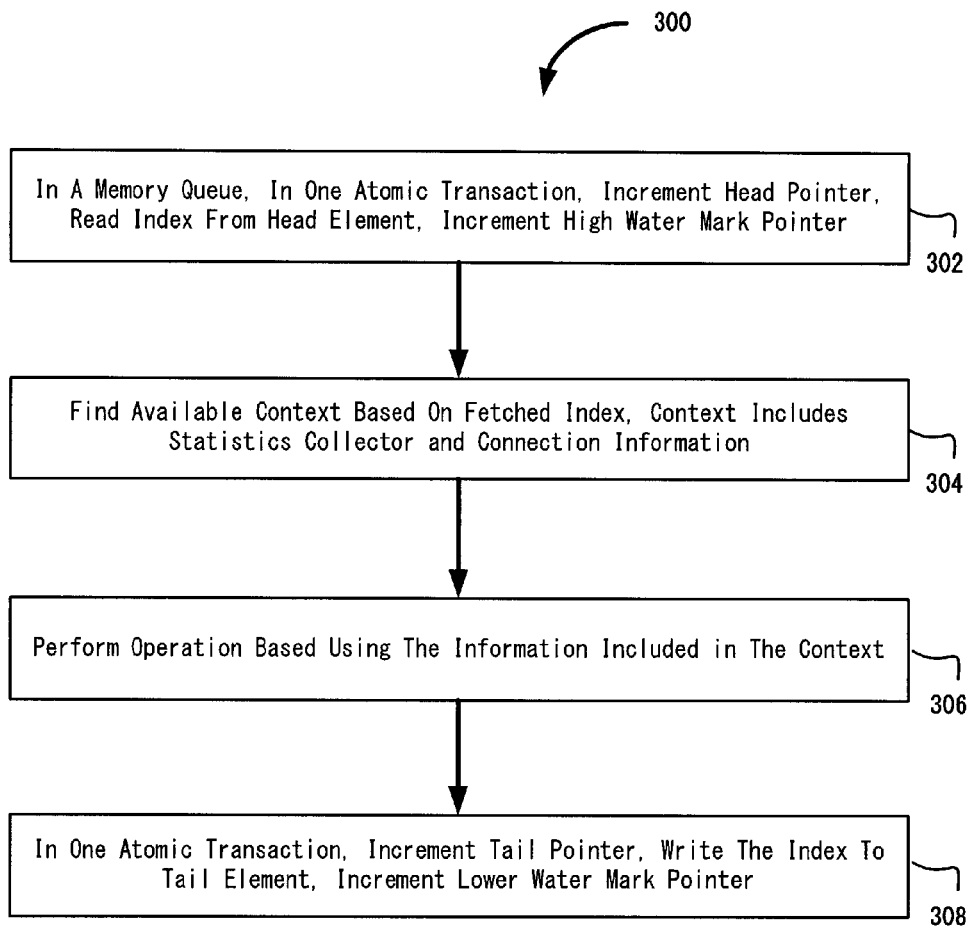
FIG. 3 illustrates an exemplary flow chart of performing a lock free operation of collecting runtime statistics, under an embodiment.

FIG. 3 illustrates a flow chart 300 of performing a lock free operation of collecting runtime statistics. The flow chart 300 includes operation that are perform by the worker thread 208. In order to provide a lock free update of collected statistical data, it must be ensured that the worker threads 208 does not random and concurrently compete for a same context in the collection of contexts 210 at any given time. The lock free statistics collector 200 ensures the same by allocating context identifications through a sets of atomic operations.

Accordingly, at step 302, when the worker thread 208 needs to update the statistics, the worker thread 208 queries the water mark queue 202 to obtain a context index or identification from the index array 204. To ensure that only one worker thread can obtain a context index at any given time, the lock free statistics collector 200 uses the CAS instruction which provides an atomic operation at the expense of any one CPU, typically. To fetch next context index, the head pointer in the water mark queue 202 is incremented, the next available index is read from the index array 204 and then high water mark pointer is incremented and all these operations are performed atomically. If another thread needs a context index, that threads waits. However, since the CAS instruction is typically performed in one CPU cycle, the wait is practically negligible.

In one example, the method steps (a) incrementing the head pointer in the water mark queue 202, (b) reading the next available index from the head element of the index array 204 and (c) incrementing the high water mark pointer, are performed exactly in the stated sequence (a) to (c).

After fetching the context index, at step 304, the worker thread 208 fetches a context corresponding to the fetched context index from the collection of contexts 210. At step 306, the worker thread 308 updates the statistics. In one embodiment, the content of the water mark queue 202 is the index array 204. Initially, first element of the water mark queue 202 has value 0, which points to head of the index array 204, and last element of the water mark queue 202 has value N-1 (where N is the preselected size or upper bound of the index array 204), which points to the tail of the index array 204. After the worker thread 208 reads the value from the water mark queue 202, the worker thread 208 uses the value as the index to locate the referenced element.

Upon finishing the operation through the fetched context, at step 308, the worker thread 308 returns back the previously fetched index back to the water mark queue 202 in one atomic operation. Accordingly, the worker thread 308 increments the tail pointer, writes the index to tail element of the water mark queue 202 and then increment the lower water mark pointer. As mentioned above, these three steps are performed atomically using the CAS instruction.

In one example, the method steps (a) incrementing the tail pointer in the water mark queue 202, (b) writing the index to the tail element of the index array 204 and (c) incrementing the lower water mark pointer, are performed exactly in the stated sequence (a) to (c). Further, in one example, steps 302 to 308 are executed exactly in the stated sequence.

In one example, the retrieval and the return of the index may be exemplarily illustrated using the following pseudo code:

```
// monotonically increasing 64 bits integers
volatile uint64_t head=_hwm=0;
volatile uint64_t tail=_lwm=QLEN-1;
// fetch free context
```

```
uint64_t fetch( ){
    // fetch head and increment one
    uint64_t new_head=add_and_fetch(&__head, 1);
    // make sure no over grow, spin if needed
    while (new_head>=_lwm);
    uint64_t ca_offset=WaterMarkQueue[new_head % QLEN];
    // update high water mark, spin if needed
    while (compare_and_swap(&_hwm, new_head-1, new_head));
    return ca_offset;
}
// return context to queue
void return(uint64_t ca_offset) {
    // fetch tail and increment one
    uint64_t new_tail=add_and_fetch(&_tail, 1);
    // make sure no overloap, spin if needed
    while (new_tail-_hwm>=QLEN);
    WaterMarkQueue[new_tail % QLEN]=ca_offset;
    // update low water mark, spin if needed
    while (compare_and_swap(&_lwm, new_tail-1, new_tail));
}
```

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for lock free collection of performance data, the system comprising: a processor-based application which when executed on a computer having a multi-core central processing unit (CPU) will cause the CPU to: create a water mark queue, the water mark queue including: a plurality of elements, each element having an index, a data structure to store an array, the array having a plurality of contexts, each context being stored in a location corresponding to an index of an element, and a plurality of pointers, the plurality of pointers including a head pointer, a tail pointer, a high water mark pointer and a lower water mark pointer, wherein the head pointer and high water mark pointer are initialized to point to a head element of the water mark queue and the tail pointer and lower water mark pointer are initialized to point to a tail element of the water mark queue; and spawn a plurality of worker threads, each configured to collect and store data from an application program, wherein the collecting and storing of the data includes: incrementing the head pointer in the water mark queue, reading an index from a head element of the water mark queue and incrementing the high water mark pointer to a next index in the water mark queue, wherein incrementing the head pointer, reading the index and incrementing the high water mark are all performed in one atomic transaction, retrieving a context corresponding to the index, performing an operation based on information contained in the context; and incrementing the tail pointer in the water mark queue, writing the index to a tail element of the water mark queue and incrementing the lower water mark pointer, wherein incrementing the tail pointer, writing the index and incrementing the lower mark pointer are all performed in one atomic transaction.

2. The system of claim 1, wherein incrementing the head pointer, reading an index from the head element of the water mark queue and incrementing the high water mark pointer are performed exactly in listed sequence.

3. The system of claim 1, wherein the data collection mechanism further includes spawning an aggregation thread.

4. The system of claim 3, wherein the application, when executed, will further cause the aggregation thread to iterate through a collection of contexts that include the context at a pre-selected interval.

5. The system of claim 4, wherein the application, when executed, will further cause the aggregation thread to retrieve the data from each of the collection of contexts and store the data in persistent storage.

6. There system of claim 1, wherein the context includes a data structure for maintaining a statistics collector variable.

7. The system of claim 1, wherein the collecting and storing the data includes using compare and swap instruction of the CPU to maintain atomicity during an operation including the incrementing the head pointer, the reading an index from the head element of the water mark queue and the incrementing the high water mark pointer.

8. A method for lock free collection of performance data from an application program that is executed in a computer having a multi-core central processing unit (CPU), the method comprising: creating a water mark queue, the water mark queue including: a plurality of elements, each element having an index, a data structure to store an array, the array having a plurality of contexts, each context being stored in a location corresponding to an index of an element, and a plurality of pointers, the plurality of pointers including a head pointer, a tail pointer, a high water mark pointer and a lower water mark pointer, wherein the head pointer and high water mark pointer are initialized to point to a head element of the water mark queue and the tail pointer and lower water mark pointer are initialized to point to a tail element of the water mark queue; and spawning a plurality of worker threads, each configured to collect and store a data from the application program, wherein the collecting and storing of the data includes: incrementing the head pointer in the water mark queue, reading an index from a head element of the water mark queue and incrementing the high water mark to a next index in the water mark queue, wherein incrementing the head pointer, reading the index and incrementing the high water mark are all performed in one atomic transaction, retrieving a context corresponding to the index, performing an operation based on information contained in the context; and incrementing the tail pointer in the water mark queue, writing the index to a tail element of the water mark queue and incrementing the lower water mark, wherein incrementing the tail pointer, writing the index and incrementing the lower mark pointer are all performed in one atomic transaction.

9. The method of claim 8, wherein incrementing the head pointer, reading an index from the head element of the water mark queue and incrementing the high water mark pointer are performed exactly in listed sequence.

10. The method of claim 8, wherein the data collection mechanism further includes spawning an aggregation thread.

11. The method of claim 10, wherein the aggregation thread is configured to iterate through a collection of contexts that include the context at a pre-selected interval.

12. The method of claim 11, wherein the aggregation thread is further configured to retrieve the data from each of the collection of contexts and store the data in persistent storage.

13. There system of claim 8, wherein the context includes a data structure for maintaining a statistics collector variable.

14. The method of claim 8, wherein the collecting and storing the data includes using compare and swap instruction of the CPU to maintain atomicity during an operation including the incrementing the head pointer, the reading an index from the head element of the water mark queue and the incrementing the high water mark pointer.

15. A computer program product, comprising computer-readable program code to be executed by one or more processors when retrieved from a non-transitory computer-readable medium, the program code including instructions to: create a water mark queue, the water mark queue including: a plurality of elements, each element having an index, a data structure to store an array, the array having a plurality of contexts, each context being stored in a location corresponding to an index of an element, and a plurality of pointers, the plurality of pointers including a head pointer, a tail pointer, a high water mark pointer and a lower water mark pointer, wherein the head pointer and high water mark pointer are initialized to point to a head element of the water mark queue and the tail pointer and lower water mark pointer are initialized to point to a tail element of the water mark queue; and spawn a plurality of worker threads, each configured to collect and store a data from the application program, wherein the collecting and storing of the data includes: incrementing the head pointer in the water mark queue, reading an index from a head element of the water mark queue and incrementing the high water mark to a next index in the water mark queue, wherein incrementing the head pointer, reading the index and incrementing the high water mark are all performed in one atomic transaction, retrieving a context corresponding to the index, performing an operation based on information contained in the context; and incrementing the tail pointer in the water mark queue, writing the index to a tail element of the water mark queue and incrementing the lower water mark, wherein incrementing the tail pointer, writing the index and incrementing the lower mark pointer are all performed in one atomic transaction.

16. The method of claim 15, wherein incrementing the head pointer, reading an index from the head element of the water mark queue and incrementing the high water mark pointer are performed exactly in listed sequence.

17. The method of claim 15, wherein the data collection mechanism further includes spawning an aggregation thread.

18. The method of claim 17, wherein the aggregation thread is configured to iterate through a collection of contexts that include the context at a pre-selected interval and retrieve the data from each of the collection of contexts and store the retrieved data in persistent storage.

19. There system of claim 15, wherein the context includes a data structure for maintaining a statistics collector variable.

20. The method of claim 15, wherein the collecting and storing the data includes using compare and swap instruction of the CPU to maintain atomicity during an operation including the incrementing the head pointer, the reading an index from the head element of the water mark queue and the incrementing the high water mark pointer.

* * * * *